US007475954B1

(12) United States Patent
Latunski

(10) Patent No.: US 7,475,954 B1

(45) Date of Patent: Jan. 13, 2009

(54) TAMBOUR CLOSURE

(75) Inventor: Paul D. Latunski, Morrice, MI (US)

(73) Assignee: May & Scofield LLC, Fowlerville, MI (US)

( * ) Notice: Subject to any disclaimer, the term of this patent is extended or adjusted under 35 U.S.C. 154(b) by 108 days.

(21) Appl. No.: 11/248,820

(22) Filed: Oct. 12, 2005

(51) Int. Cl.
*B60R 27/00* (2006.01)

(52) U.S. Cl. .................................... 312/297; 296/24.34

(58) Field of Classification Search .................. 160/37, 160/230, 231.1, 232.2, 232; 312/297; 296/24.34, 296/37.8; 220/539, 350, 351, 345.4, 345.3, 220/254.9, 345.1; 224/539, 483, 926, 311; 52/309.16, 309.7; 198/846, 847, 850
See application file for complete search history.

(56) References Cited

U.S. PATENT DOCUMENTS 262,312 A * 8/1882 Rearden ..................... 312/280
2,099,122 A * 11/1937 Kreisler ...................... 132/303
2,140,836 A * 12/1938 Gerhardt ..................... 312/237
2,305,044 A * 12/1942 Toews ..................... 198/690.2
2,690,216 A * 9/1954 Scott .......................... 220/350
2,803,297 A * 8/1957 Wenke ....................... 160/133
2,875,887 A * 3/1959 Hinchcliffe ................. 198/699
3,092,170 A * 6/1963 Ellis ............................ 160/26
3,310,161 A * 3/1967 Kraft, Jr. ..................... 198/847
3,645,597 A * 2/1972 Sakow ........................ 312/297
4,078,654 A * 3/1978 Sarovich ................ 198/867.14
4,316,536 A * 2/1982 Verbeek ...................... 198/699
4,461,232 A * 7/1984 Berg ...................... 114/201 R
4,553,288 A * 11/1985 Schneider et al. ............. 19/113
4,553,663 A * 11/1985 Johnson ...................... 198/731
4,681,379 A * 7/1987 Pillinini ...................... 312/297
4,846,247 A 7/1989 Kessler
4,901,436 A * 2/1990 Gosch et al. ............... 30/43.92
4,961,895 A 10/1990 Klein
5,058,756 A 10/1991 Green
5,065,808 A 11/1991 Hopperdietzel
5,255,970 A * 10/1993 Theosabrata ................ 312/297
5,445,206 A * 8/1995 Shepard ...................... 160/201
5,494,181 A * 2/1996 Denney ....................... 217/62
5,549,149 A 8/1996 Sills et al.
5,671,839 A * 9/1997 Sanderson .................. 198/848
5,803,563 A 9/1998 Woodward
5,805,075 A 9/1998 Carlson et al.
6,053,591 A 4/2000 Kasanic
6,422,672 B1 7/2002 Searer
6,478,204 B2 * 11/2002 Lange et al. ................ 224/539
6,499,785 B2 * 12/2002 Eguchi ...................... 296/37.8
6,618,981 B1 9/2003 Rodriguez
6,672,554 B2 * 1/2004 Fukuo ..................... 248/311.2
6,779,857 B2 8/2004 Waisbrod et al.
7,287,795 B1 * 10/2007 Thomas ................... 296/24.34
2002/0070220 A1 6/2002 Kuehn et al.
2004/0130174 A1 7/2004 Laskey
2004/0206462 A1 10/2004 Fitzgerald et al.
2007/0102463 A1 * 5/2007 Thomas ...................... 224/275

FOREIGN PATENT DOCUMENTS

WO WO2005-042868 5/2005

* cited by examiner

*Primary Examiner*—Janet M Wilkens
(74) *Attorney, Agent, or Firm*—Rader, Fishman & Grauer, PLLC

(57) ABSTRACT

In the embodiments and methods described, a tambour closure is employed having a flexible surface and a plurality of ribs secured to the flexible surface, each of the plurality of ribs includes a structural support disposed inside of a molded body.

8 Claims, 5 Drawing Sheets

14
62
10
2
16
F
60
12

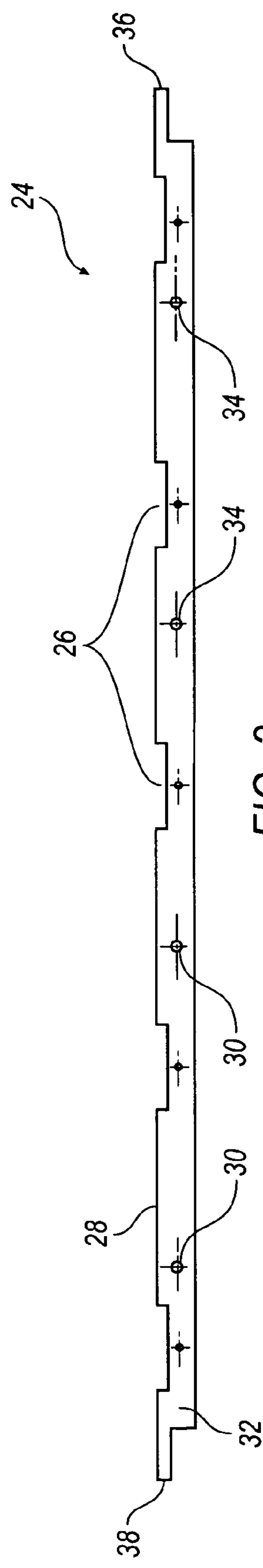
FIG. 3
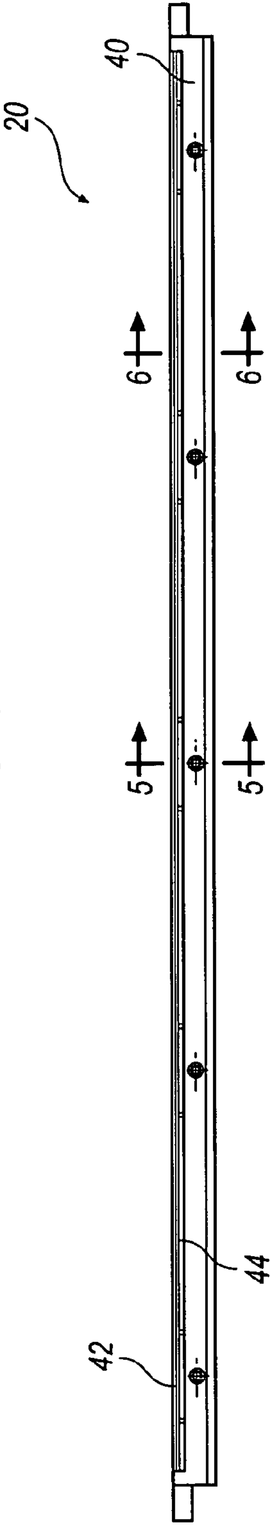
FIG. 4
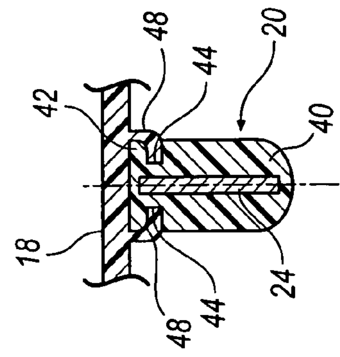
FIG. 6
FIG. 5

TAMBOUR CLOSURE

TECHNICAL FIELD

The embodiments described herein are generally directed to a tambour closure.

BACKGROUND

Tambour doors composed of individual profiled members are known in many forms. The tambour system offers many advantages for design variations, especially where space is the significant factor, e.g. in kitchens, bathrooms, etc. However, there are endless uses for tambour doors, e.g. storage cabinets, cupboards, bathroom and medical cabinets, mobile carts or trolleys, cassette boxes, office furniture, vehicle components, etc.

Typical tambour doors are available in solid wood, wood veneer, plastic material, and metal at a large variety of colors and profiles. Solid straps/slats are either pivotally articulated to one another to form the door panel, or are molded or bonded to either a strong cloth or resin impregnated non-woven backer, for retaining the slats in position and imparting the door panel pliability so it can be rolled between open and closed positions. The door panel is slidingly received within a pair of opposed guide rails/tracks (side rails or top/bottom as may be the case), and often there are provided suitable handle or latch means to facilitate displacement of the door between its closed and open positions.

Tambour panels are typically flexible panels used for fast construction of walls (in particular partitions) and ceilings, wainscot and decorative cover panels etc. and are easily constructed and applied over non-flat (curved) areas.

A variety of tambour doors and tambour panels are known. For example, earlier tambour doors comprise a door panel comprising a plurality of panels/slats arranged in juxtaposed parallel relation and adhered over a pliable layer of material. Other tambour door panels are assembled of plurality of longitudinal segments or profiles pivotally hinged to one another about their longitudinal edges. Such profiles often do not require to be adhered over a carrying matrix (e.g. cloth).

However, there also exist tambour doors where the door panel is a uniform panel made of a plastic material made by vacuum forming of a thin plastic sheet wherein the front face of the door comprises a series of relatively wide parallel face strips which are joined to each other by integral thin connecting portions having a generally U-shaped cross section. The relatively thicker face strip portions provide rigidity to the door and resist vibration while the thin interconnecting portions act as hinges to permit the door to be easily guided in a curved door track having a relatively small radius.

Some tambour closures, such as those used in roll top desks, consist of a plurality of rigid wooden strips arranged in parallel fashion side-by-side and glued to a canvas backing material. The canvas backing material allows the tambour closure to flex which in turn allows the tambour closure to follow a curved path. This type of tambour closure is typically positioned in a track or guide and is completely free to move in the track.

However, in circumstances where these doors are subjected to significant loading including circumstances where a heavy weight could be placed on the door, the typical tambour doors do not provide adequate support. Thus, a need exists for an improved tambour that has a significant weight bearing capacity while providing a decorate surface.

SUMMARY

In the embodiments and methods described, a tambour closure is employed having a flexible surface and a plurality of ribs secured to the flexible surface, each of the plurality of ribs includes a structural support disposed inside of a molded body.

Various aspects and advantages of this invention will become apparent to those skilled in the art from the following detailed description of the embodiments described herein, when read in light of the accompanying drawings.

BRIEF DESCRIPTION OF THE DRAWINGS

The features and inventive aspects of the present invention will become more apparent upon reading the following detailed description, claims, and drawings, of which the following is a brief description:

FIG. 3 is an elevational front view of a structural support of the tambour closure in FIG. 1 before a molded body is formed over the structural support;

FIG. 4 is an elevational front view of a rib of the tambour closure in FIG. 1;

FIG. 5 is a detailed cross-sectional view of one rib of the tambour closure along line 5-5 in FIG. 4; and FIG. 6 is a detailed cross-sectional view of one rib of the tambour closure along line 6-6 in FIG. 4.

DETAILED DESCRIPTION

Figure 1:
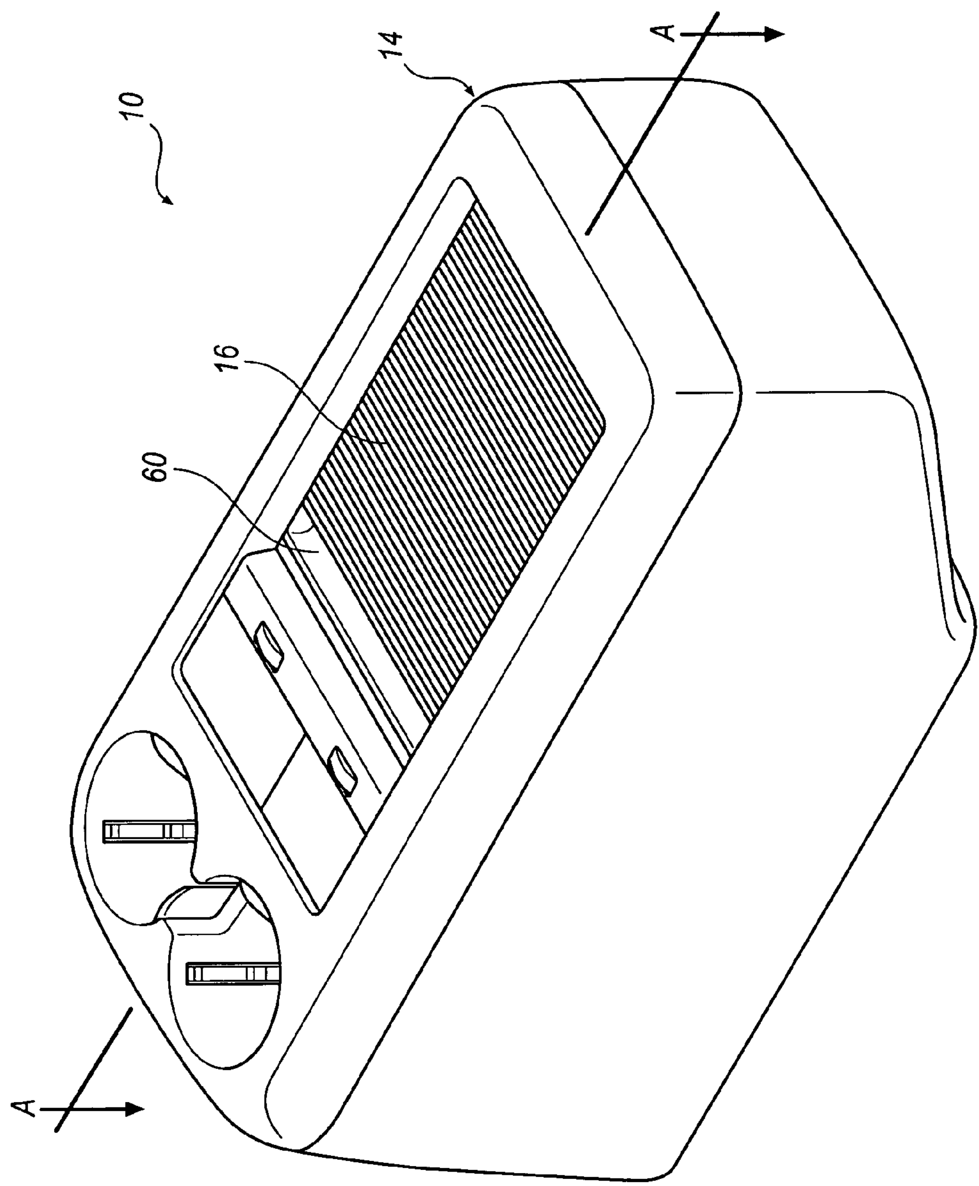
FIG. 1 is an elevational perspective view of one embodiment of a tambour system along having a tambour closure in a closed position.

Referring now to the drawings, illustrative embodiments are shown in detail. Although the drawings represent the embodiments, the drawings are not necessarily to scale and certain features may be exaggerated to better illustrate and explain an innovative aspect of an embodiment. Further, the embodiments described herein are not intended to be exhaustive or otherwise limit or restrict the invention to the precise form and configuration shown in the drawings and disclosed in the following detailed description.

Figure 1A:
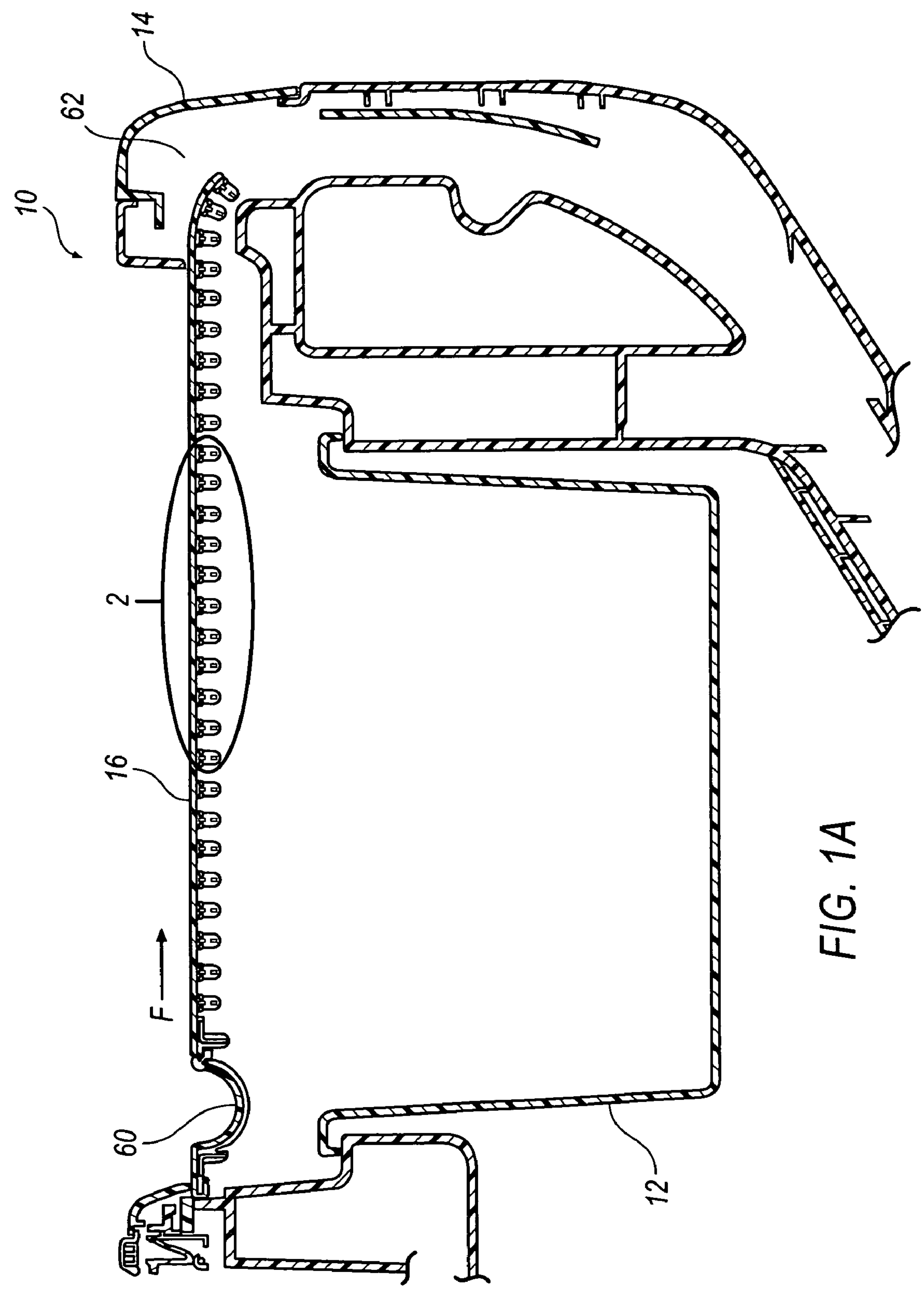
FIG. 1A is a cross-sectional view along section line A-A of the tambour system in FIG. 1 having a tambour closure in a closed position.
Figure 1B:
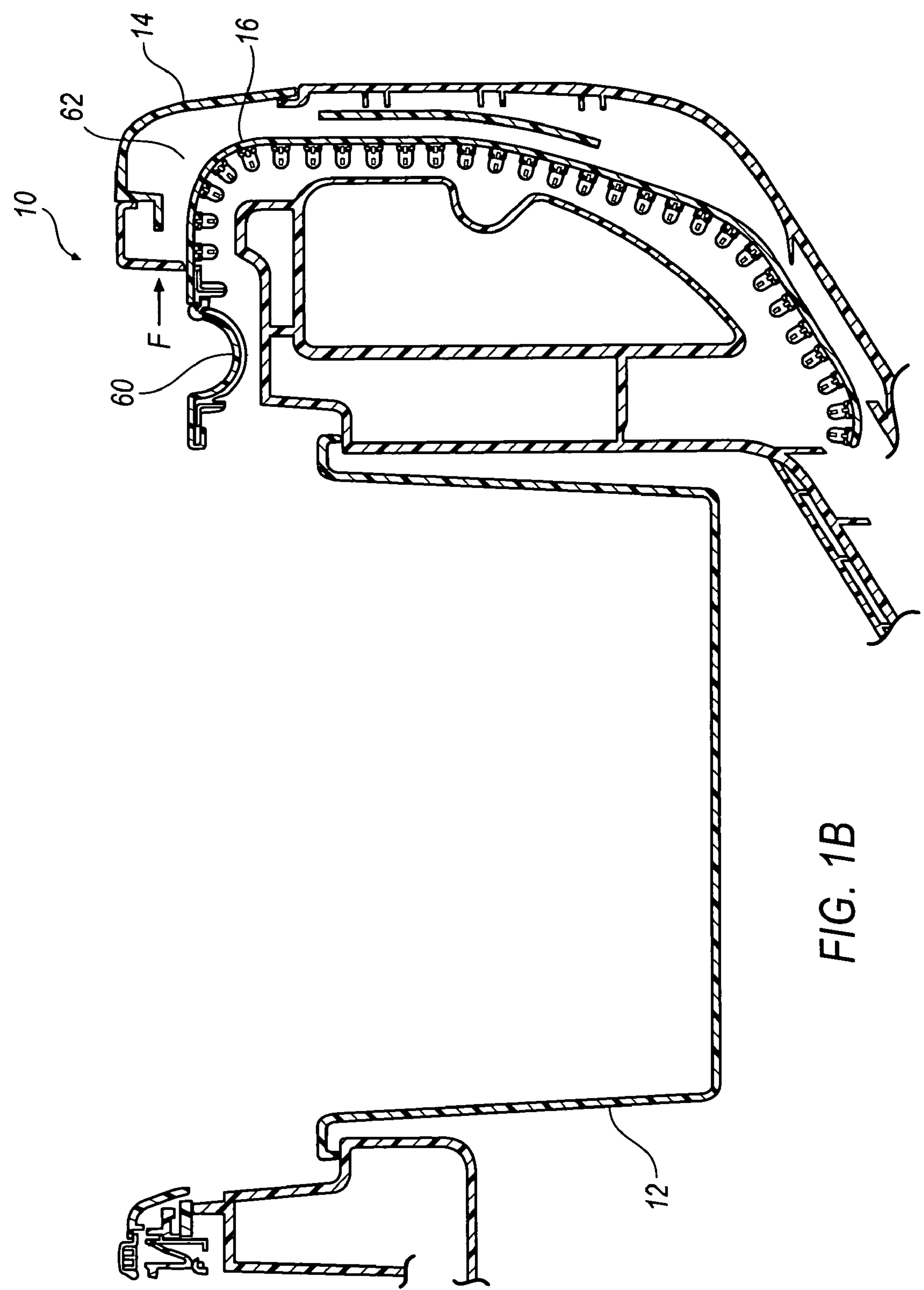
FIG. 1B is a cross-sectional view along section line A-A of the tambour system in FIG. 1 having a tambour closure in an open position.

Referring now to FIGS. 1, 1A, and 1B, one embodiment of a tambour system 10 is shown including a container 12, a vehicle center consol 14, and a tambour closure 16. In FIGS. 1 and 1B, the tambour system 10 is shown with the tambour closure in the completely closed position. The novel tambour system 10 minimizes packaging within the center consol 14. Furthermore, the high strength tambour closure 16 supports the weight of kids, for instance, kneeling on the closure 16 inside a vehicle (not shown) as further discussed below.

Figure 2:
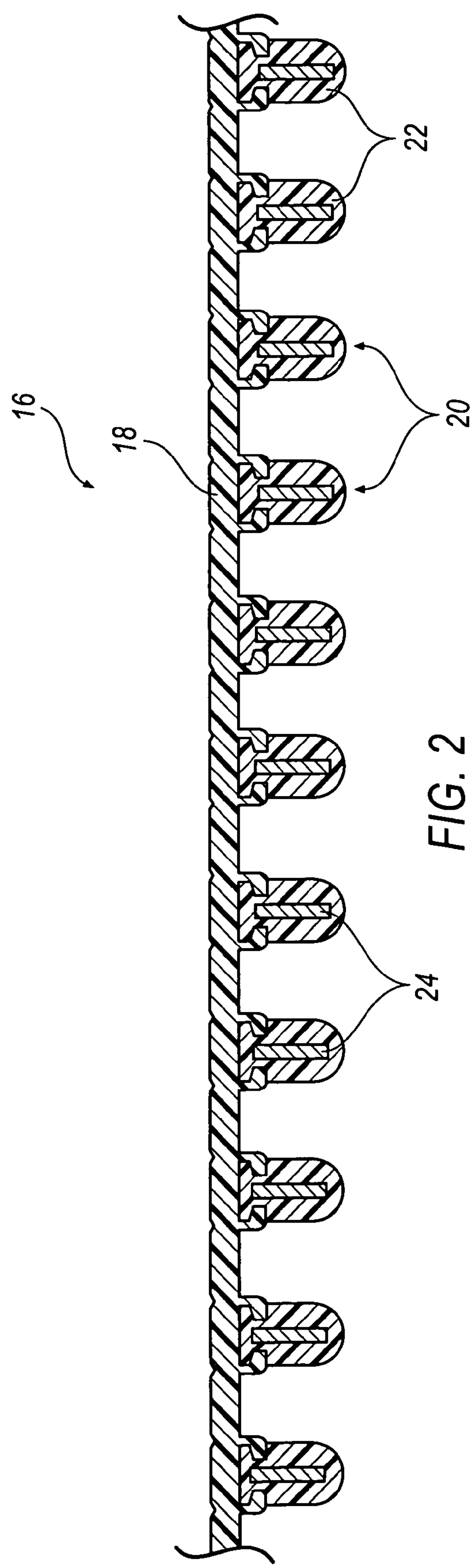
FIG. 2 is a detailed cross-sectional view of the tambour closure in FIG. 1 as indicated by balloon 2.

FIG. 2 shows one embodiment of the tambour closure 16 including a flexible surface 18 and a plurality of ribs 20 having a molded outer surface 22 and a structural support 24. The ribs 20 are spaced a predetermined distance apart depending on a user's strength requirement for the tambour closure 16. The ribs 20 are also positioned substantially parallel to each other along the longitudinal length of the tambour closure 16.

In FIG. 3, one embodiment of the structural support 24 of a rib 20 is shown. Each structural support 24 includes a plurality of grooves 26 along the longitudinal length of the structural support 24. Each groove 26 is spaced a predetermined distance from another groove 26 depending on the user's requirement of interlocking between the rib 20 and the flexible surface 18 as further discussed below. The groove 26 is disposed on the support upper surface 28 extending downwardly into the structural support 24. Grooves 26 are shown generally rectangular, however, each groove 26 may include any shape, size, or orientation capable of mechanically interlocking the flexible surface 18 to the rib 20. The terms "lock" and "interlock" include but are not limited to: securing, holding, fixing, engaging, grapping, clasping, and fastening. A plurality of interlocking apertures 30 are disposed on a support face 32 and are spaced a predetermined distance for interlocking as defined above another structure to the structural support 24 of the rib 20 as further discussed below. The number, size, and shape of the apertures 30 may be varied depending on the user's requirement. A plurality of production apertures 34 are also disposed on the support face 32 and spaced a predetermined distance from each other. Each production aperture 30 is configured to provide a manufacturing tool (not shown) to center the structural support 24 during production in the over-molding process. However, other methods of keeping the structural support 24 fixed during the over-molding process are contemplated including keeping the first end 36 and second end 38 of the structural support 24 fixed. In addition, the first and second ends 36, 38 of the structural support 24 may extend outwardly from the structural support 24 at the support upper surface 28 as shown in FIG. 3 for engagement with rails (not shown) of the tambour system 10 as further discussed below. The structural support 24 is preferably formed from a metal; however, any material with the strength properties desired by the user will work including a plastic, polyamide resin, and composite nylon.

The interlocking apertures 30 provide a mechanical securing mechanism for an over-mold such as a molded body 40 as shown in FIG. 4. The molded body 40 is generally formed around a substantial portion of the structural support 24 and is mechanically interlocked to the structural support 24 through each interlocking aperture 30. The molded body 40 interlocks with the structural support 24 as defined above including mechanically interlocking with the support structure 24 by having a portion of the molded body 40 disposed in each interlocking aperture 30. Each rib 20 includes a molded upper portion 42. The upper portion 42 is generally a similar width as the width of the molded body 40 and is disposed proximate the support upper surface 28. This configuration provides a raceway 44 along a substantial portion of the longitudinal length of the molded body 40. The raceway 44 provides an interlocking mechanism between the rib 20 and the flexible surface 18 as further discussed below.

Referring to FIGS. 5 and 6, the flexible surface 18 is interlocked with the rib 20 by having the flexible surface 18 molded such that a first surface portion 46 is molded into groove 26 between the rib 20 as shown in FIG. 5. This configuration forms a mechanical bond between the rib 20 and the flexible surface portion 18 at each of the grooves 26 of the structural support 24. Furthermore, each rib 20 is in mechanical communication with the flexible surface 18 by having a second surface portion 48 molded into the raceway 44 of the rib 20 as shown in FIG. 6. The combination of having the first surface portion 46 and the second surface portion 48 interlocked with each rib 20 provides additional strength between each rib 20 and the flexible surface 18. However, it is contemplated that less strength may be desirable by the user and one of the two molding techniques may suffice in forming a mechanical bond between the rib 20 and the flexible surface 18. By way of example, having a mechanical interlocking mechanism between the flexible upper surface 18 and the rib 20 is superior to that of surface adhesion between the flexible surface 18 and the rib 20 because typical adhesion techniques may fail in situations where the tambour closure 16 is exposed to a high heat inside a vehicle. The term "flexible" includes but is not limited to: a surface being completely made of an elastomeric material; a surface being generally made from an elastomeric material including portions having rigid components; and a surface having rigid components between bendable portions than are capable of bending around a corner. The terms "bend" and "bendable" include but are not limited to: flexing, bending, mechanical rotation, and mechanical pivoting.

The flexible surface 18 may be formed from a different material than the molded body 40 or may be molded at generally the same time with generally the same material. However, the flexible surface may have different appearances. For example, the flexible surface may have at least one surface texturized e.g. to resemble wood or metal, or be colored in any desired color. Alternatively, the flexible surface 18 may be translucent or transparent to facilitate viewing items stored behind the tambour closure 16. In addition, the flexible surface may be made from a scratch resistant material providing an aesthetically pleasing design while providing a functional cover for a vehicle trim component such as the vehicle center consol 14.

By way of example, to operate the tambour closure 16 from the closed position as shown in a first embodiment in FIG. 1, an operator pulls a handle 60 with a predetermined deployment force in the direction of arrow F. Sufficient application of the predetermined deployment force in the direction of the arrow F causes deformation or bending of the tambour closure 16 at generally a flex point 62 as shown if FIG. 1B. The first and second ends 36, 38 of the rib 20 in FIG. 3 ride along rails (not shown) of the tambour system 10. Enough friction at the first and second ends 36, 38 exists to prevent undesirable deployment of the tambour closure 16 without the user exerting the predetermined deployment force. In addition, the location of the flex point 62 prevents undesirable deployment of the tambour closure 16 by providing an additional point of force acting against the direction of arrow F.

The first embodiment of the tambour system 10 describing the vehicle center consol 14 of the vehicle enhances strength; reduces space by having the tambour closure 16 disappear into the consol 14; includes a weight bearing capacity capable of supporting any amount of weight desired depending on the user requirements; and provides a high degree of flexibility. In addition, the tambour closure 16 provides an aesthetically pleasing cover to a vehicle trim component such as the consol 14.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

What is claimed is:

1. A tambour closure comprising:

a flexible surface; and a plurality of ribs secured to said flexible surface, each of said plurality of ribs includes a structural support disposed inside of a molded body, wherein said structural support includes at least one interlocking aperture interlocking said molded body to said structural support by having a portion of the molded body disposed in said interlocking aperture.

2. The tambour closure of claim 1, wherein each of said ribs includes a raceway disposed on a first side and a second side of said rib proximate an upper portion mechanically interlocking said rib to said flexible surface.

3. A tambour closure comprising:

a flexible surface; and a plurality of ribs secured to said flexible surface, each of said plurality of ribs includes a structural support disposed inside of a molded body, wherein said structural support includes at least one groove disposed proximate an upper portion of said structural support mechanically interlocking said flexible surface to said structural support.

4. The tambour closure of claim 3, wherein each of said ribs includes a raceway disposed on a first side and a second side of said rib proximate an upper portion mechanically interlocking said rib to said flexible surface.

5. A tambour closure comprising:

a flexible surface;

at least one structural support disposed proximate said flexible surface;

a molded body disposed at least partially around said structural support;

at least one interlocking aperture disposed in said structural support, securing said molded body to said structural support by having a portion of the molded body disposed in said interlocking aperture; and at least one groove disposed proximate an upper portion of said structural support securing said structural support to said flexible surface.

6. The tambour closure of claim 5, wherein said structural support is formed from metal.

7. The tambour closure of claim 5, wherein said molded body is formed from plastic.

8. The tambour closure of claim 5, wherein said molded body includes a raceway disposed on a first side and a second side of said molded body proximate an upper portion securing said molded body to said flexible surface.

* * * * *